United States Patent [19]
Beisswenger et al.

[11] Patent Number: 5,336,317
[45] Date of Patent: Aug. 9, 1994

[54] PROCESS FOR MAKING CEMENT USING LOW-GRADE FUELS

[75] Inventors: Hans Beisswenger, Bad Soden; Jochim Eschenburg, Friedrichsdorf; Johannes Löffler, Bad Homburg, all of Fed. Rep. of Germany

[73] Assignee: Metallgesellschaft AG, Frankfurt am Main, Fed. Rep. of Germany

[21] Appl. No.: 29,784

[22] Filed: Mar. 11, 1993

[30] Foreign Application Priority Data

Mar. 20, 1992 [DE] Fed. Rep. of Germany ....... 4208977

[51] Int. Cl.$^5$ .................. C04B 7/45; C04B 18/22; C04B 18/24
[52] U.S. Cl. .................. 106/745; 106/744; 106/755; 106/758
[58] Field of Search ............. 106/744, 745, 755, 758, 106/761, 762, 771, 765

[56] References Cited

U.S. PATENT DOCUMENTS

| | | | |
|---|---|---|---|
| 3,955,995 | 5/1976 | Touborg | 106/744 |
| 4,081,285 | 3/1978 | Pennell | 106/744 |
| 4,110,121 | 8/1978 | Rechmeier et al. | 106/758 |
| 4,123,288 | 10/1978 | Stringer et al. | 106/758 |
| 4,533,396 | 8/1985 | Herchenbach et al. | 106/762 |
| 4,627,877 | 12/1986 | Ogawa et al. | 106/745 |
| 4,678,514 | 7/1978 | Deyhle et al. | 106/745 |
| 4,913,742 | 4/1990 | Kwech | 106/758 |

FOREIGN PATENT DOCUMENTS

| | | | |
|---|---|---|---|
| 0076175 | 4/1983 | European Pat. Off. | 106/744 |
| 2411672 | 9/1974 | Fed. Rep. of Germany. | |
| 2627056 | 12/1977 | Fed. Rep. of Germany. | |
| 2637330 | 2/1978 | Fed. Rep. of Germany | 106/758 |
| 0132733 | 10/1978 | Fed. Rep. of Germany | 106/744 |
| 2753390 | 4/1979 | Fed. Rep. of Germany | 106/758 |
| 3218232 | 2/1984 | Fed. Rep. of Germany. | |
| 3334686 | 4/1985 | Fed. Rep. of Germany. | |
| 3522883 | 1/1987 | Fed. Rep. of Germany. | |
| 3533775 | 3/1987 | Fed. Rep. of Germany. | |
| 3727218 | 2/1989 | Fed. Rep. of Germany. | |

OTHER PUBLICATIONS

Krupp Polysius, Zement-Report Mar. 91, "Spexielle Calainiersysteme Für Individuelle, Anforderungen: NO$_x$-Minderung Bis 50% MIT PREPOL-MSC".

A. Schweizer, et al, Zement-Kalk-Gips No. 5/1991 (44th year), pp. 217–220.

*Primary Examiner*—Mark L. Bell
*Assistant Examiner*—Paul Marcantoni
*Attorney, Agent, or Firm*—Michael J. Stricker

[57] ABSTRACT

A process for producing cement, including preheating a mixture of ground raw materials (raw meal) in a preheating cyclone to form a preheated raw meal, calcining the preheated raw meal in a calciner to form a calcined raw meal, burning the calcined raw meal in a rotary kiln with the aid of a high-grade fuel to form a cement clinker, cooling the cement clinker in a rotary kiln and grinding the cooled cement clinker. The process is characterized by replacing 50 to 70% of the high-grade fuel with a low-grade fuel, gasifying the low-grade fuel in a fluidized bed to form a resulting fuel gas, supplying a first portion of the resulting fuel gas to a main burner of the rotary kiln, a second portion of the resulting fuel gas to the exhaust gas stream from the rotary kiln and a third portion of the resulting fuel gas to the calciner.

20 Claims, 1 Drawing Sheet

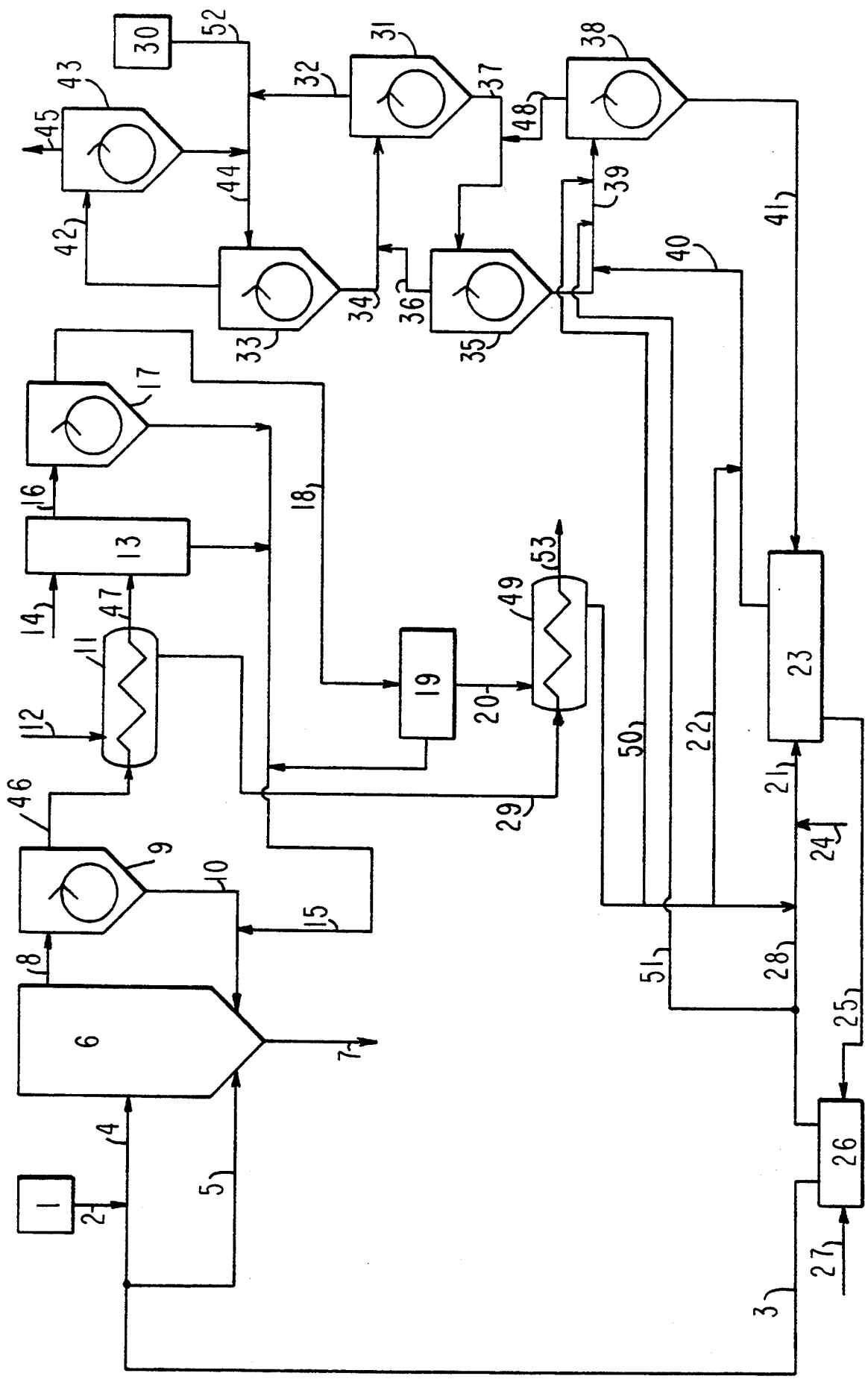

PROCESS FOR MAKING CEMENT USING LOW-GRADE FUELS

BACKGROUND OF THE INVENTION

The present invention relates to methods of making cement.

A process of making cement is known in which a mixture of ground raw materials (raw meal) is preheated in a preheating cyclone, the preheated raw meal is calcined, the calcined raw meal is burned in a rotary kiln, the cement clinker formed in the rotary kiln is cooled and the cement clinker is ground.

Cement is an inorganic nonmetallic powder, which is mixed with water and, after that mixing, spontaneously hardens and remains permanently solid after it has hardened. A distinction is made between various so-called standard cements, which include Portland cement, iron Portland cement, blast furnace slag cement and trass cement. The standard cements produced in the Federal Republic of Germany have the following chemical composition: CaO 41 to 67% by weight, $SiO_2$ 18 to 33% by weight, $Al_2O_3$ 3 to 14% by weight, $Fe_2O_3$ 0.5 to 4.5% by weight, MnO 0 to 0.6% by weight, MgO 0.5 to 9% by weight and $SO_3$ 1 to 4.5% by weight.

The production of hydraulic cement includes the procuring and dressing of raw materials, the burning of the mixed raw materials to produce cement clinker, the production of the inter-grindable substances and the joint grinding of the clinker and optionally one or more inter-grindable substances as well as calcium sulfate as a setting and hardening control agent. The raw materials (limestone and clay) are ground in a dry state to produce the raw meal, which, during the grinding operation, is dried by a hot gas and is subsequently heated and thereafter burned to produce cement clinker Depending on the type of the kiln the raw meal is heated for about 1 to 5 hours to burning temperature of about 1450° C. and is held at that temperature for about 10 to 20 minutes. Thereafter the cement clinker is cooled as rapidly as possible. As the raw meal, which may still have residual moisture content below 1%, is heated the adhering water is removed at temperatures up to about 100° C. and the water which is adsorptively and chemically bound in the clay is removed at temperatures up to about 600° C. In the presence of $SiO_2$, $Al_2O_3$ and $Fe_2O_3$ the decomposition of the calcium carbonate begins at temperatures as low as 550° to 660° C. and proceeds very rapidly above 900° C. During the burning the mixture loses about 35% by weight of its dry weight. In the Federal Republic of Germany, about 97% of the cement clinker is burned in rotary kilns, which have an inclination of 3 to 4 degrees. Because of the inclination and rotation of the kiln the preheated raw meal fed at the upper end flows toward a flame produced by a pulverized coal or oil or gas burner, which is provided at the lower end of the kiln. The mixture is heated to a temperature for 1350° to 1500° C., which is required for formation of clinker. In the vicinity of the flame the temperature is from 1800° to 2000° C. The burnt clinker leaves the rotary kiln and falls into a cooler, in which air is used as a cooling fluid and in which the clinker is cooled to a temperature of 800° to 900° C. The air that has been used to cool the cement clinker is supplied to the rotary kiln as combustion air. The raw meal is preheated either in the rotary kiln or in a separate preheater, which preferably consists of a unit comprising a plurality of cyclones. The hot exhaust gases from the rotary kiln flow through the cyclone preheater from bottom to top and the dry raw meal is added to the exhaust gases before the upper most cyclone stage. The dry raw meal is again removed from the gas in each cyclone and before the next cyclone stage is resuspended in the gas stream. In the preheater the raw meal is usually heated to a temperature of about 800° C. The exhaust gas leaving the uppermost cyclone stage is still at temperatures of 300° to 400° C. The raw meal may already be calcined in part in the cyclone preheater. In the prior art the raw meal which has been preheated and slightly calcined in the preheater is calcined in a separately fired calciner, which desirably constitutes a cyclone and in which a major part of the calcining is effected. The calcined raw meal is supplied to the rotary kiln for burning of clinkers. The rotary kiln preforms in addition the remaining calcining. The heat requirement of the calciner is from 30 to 70% of the total heat required for burning the clinker. To produce cement, the cement clinker is ground alone or with inter-grindable substances like blast furnace sand, trass, oil shale or fly ash. Gypsum for controlling the setting and hardening is also added to the clinker which is to be ground Because the cement clinker is produced at very high temperatures, the rotary kiln is heated with comparatively high-grade fuels, which also afford the advantage that, because of their relatively low ash content, they only slightly change the composition of the raw meal. The use of low-grade, high-ash fuels is difficult, because their heating value is too low and because of their fluctuating and high ash content, they change the quality of the cement to such an extent that it no longer complies with the quality requirements specified in the standards. Besides, low-grade fuels often have a high content of accompanying substances, which must not enter the cement or are allowed to enter it only in part. Finally, the burning in the rotary kiln and the calcining in the calciner result in a formation of nitrogen oxides, which must be removed from the exhaust gas.

SUMMARY OF THE INVENTION

It is an object of the present invention to provide a method of producing cement which permits use of low-grade fuels and which produces an exhaust gas substantially free of pollutant gases, such as nitrogen oxides, hydrocarbons and carbon monoxides.

According to the invention this object is attained by a method in which the high-grade fuels used to produce cement are, in part, replaced by low-grade fuels, which are gasified in a fluidized bed, and the resulting gas is divided into three partial streams, the first of which is supplied to the main burner of the rotary kiln, the second to the exhaust gas stream from the rotary kiln and the third to the calciner. High grade fuels used in the production of cement—i.e., in the rotary kiln and in the calciner—are oil, gas and/or high-grade coal having a net heating value $>4000$ kcal/kg. According to the invention the fuels are replaced as far as possible by low-grade fuels, such as biomass, waste wood, chemical industry waste material, old tires and paper. The low-grade fuels are preferably gasified in a fluidized bed. The solid gasification residues formed in the fluidized bed are discharged from the bottom of the reactor or as fly dust. The ash collected at the bottom of the reactor has a very low carbon content. The fly dust is very fine and because of its high carbon content has an extremely high reactivity. According to the invention a part of the gas produced by the gasification is burned in the main burner of the rotary kiln and thus replaces a part of the high-grade fuel which in known processes is fed to the rotary kiln. The second partial stream of the gas is mixed with the exhaust gas stream leaving the rotary kiln. The third partial stream of the gas is fed to the calciner and replaces there the high-grade fuel that is usually employed. The gas supplied to the exhaust gas that has left the rotary kiln acts as a reducing agent for the nitrogen oxides, because at temperatures from 800° to 1100° C. the nitrogen oxides are reduced to nitrogen, particularly by the substances $NH_3$, CO and $H_2$ in the presence of oxygen. Surplus combustible components of the gas are burned in the calcining stage.

It is apparent that the process according to the invention provides the advantage that low-grade fuels may also be used in the production of cement in such a way that the pollutants formed by combustion of low-grade fuels do not enter the atmosphere or cement. Another advantage provided by the method is that a separate denitrification of the exhaust gas is not required. Finally it is possible in many cases to use the gasification residues as a raw material in the production of cement because they contain less than 2% by weight carbon.

According to a preferred embodiment of the invention 50 to 70% of the high-grade fuels are replaced by low-grade fuels. This kind of processing is most economical.

Also according to the invention, the low-grade fuel is gasified in a circulating fluidized bed. In that embodiment the fuel is fed to a reactor which is free of internal fixtures and to which in addition the air that is required for the gasification is supplied in the form of a plurality of partial streams. In the reactor the temperature is from 750° to 1000° C., when the low-grade fuel is autothermally converted to gaseous combustible substances. The solid particles which are entrained by the gas stream leaving the reactor are separated from the gas space in a separator, preferably a cyclone, which follows the gas space, and are recycled to the reactor through a recycle line. Part of the gasification residues is continuously withdrawn from the reactor at its bottom and the pre-dedusted combustible gas leaves the cyclone. The gas flows in the reactor at a velocity of 2 to 12 m/sec. The density of the gas-solids suspension in the reactor decrease from bottom to top and is between 50 to 500 $kg/m^3$ at the bottom and between 0.5 and 10 $kg/m^3$ at the top. This means that the reactor has a substantial loading of solids, which serves as a heat accumulator and permits constant gasification conditions and ensures that the gasification residues withdrawn at the bottom have a very low carbon content.

According to a further feature of the invention the combustion air which is fed to the rotary kiln and the gasifying air which is fed to the fluidized bed are preheated in the clinker cooler. That produces an advantageous energy balance of the overall process.

According to a further feature of the invention the gas produced by the gasification of the low-grade fuels is cooled to a temperature from 70° to 400° C. and is dedusted in at least one cyclone and/or at least one electrostatic filter and/or at least one bag filter. In some cases it has been found that the gas which has been produced by the gasification is desirably dedusted before its further use.

Also according to the invention the dedusted gas is reacted at 70° to 400° C. with calcium oxide and/or calcium hydroxide. In that case almost all of the HF and HCl and part of the $H_2S$ and $SO_2$ react with the calcium compounds to form the corresponding salts.

It is particularly advantageous when the gas which has been dedusted or which has been reacted with CaO and/or $Ca(OH)_2$ is desirably reheated with the heat which has been taken from the gas before it has been dedusted or before it has been reacted with the calcium compounds.

Finally in accordance with the invention a fourth partial stream is taken from the gas which is combusted and used to heat the exhaust air from the clinker cooler. Because of that, the temperature of the exhaust air conducted from the clinker cooler can be increased form 400° C. to between 600° and 700° C. to generate high-grade energy.

The publication by Schweizer, Herbert and Löffler in Zement-Kalk--Gips, 44th year, 1991, on pages 217 to 220 discloses a process of burning $CaCO_3$ with a gaseous fuel, which is produced by gasification of low-grade fuels (tree bark, residual wood, cellulose fibers) in a circulating fluidized bed and it is also suggested in this reference that the gas produced by gasification in the circulating fluidized bed can be used to replace a part of the main fuel in rotary kilns for producing cement. One skilled in the art could not find a hint or suggestion of the method of the invention from this reference however, because that publication does not contain any information regarding how the fuel gas produced by the gasification of low-grade fuels can be used in the process of producing cement. Besides, the fact that German Patent Publication 2,411,672 discloses a method of removal of nitrogen oxides from oxygen-containing combustion exhaust gases in which the nitrogen oxides are selectively reduced with ammonia in the presence or absence of hydrogen gas, carbon monoxide and/or hydrocarbons at temperatures from 705° to 1095° C. has not induced those skilled in the art to provide the process in accordance with the invention. This is because that publication does not contain a suggestion that the fuel gases produced by gasification of low-grade fuels should be used to denitrify the exhaust gas which has been formed in production of cement.

BRIEF DESCRIPTION OF THE DRAWING

The objects, features and advantages of the present invention will now be illustrated in more detail by the following detailed description, reference being made to the accompanying drawing in which:

The sole figure is a schematic diagram of the process according to the invention.

DETAILED DESCRIPTION OF THE PREFERRED EMBODIMENT

Comminuted wood waste is stored in the storage bin 1 and is a low-grade fuel. The wood waste leaves the storage bin 1 through line 2 and is mixed with the gasifying air, which is fed through line 3. The air-fuel mixture flows through line 4 to the reactor 6, in which a circulating fluidized bed is maintained. A partial stream of the gasifying air conducted in line 3 is fed through line 5 to the bottom part of the reactor 6. The fuel is fluidized in the reactor 6 by air streams from lines 4 and 5. The volume flow rate of air supplied to the reactor 6 is calculated so that the oxygen volume flow rate is lower by 30 to 60% than the volume flow rate of oxygen for complete combustion of the low-grade fuel to form $CO_2$ and $H_2O$. This means that the air ratio λ is from 0.4 to 0.7. A gasification temperature from 750° to 950° C. is maintained in the reactor 6.

The gasification residues which are collected in the bottom part of the reactor contain about 2% by weight carbon and are withdrawn from the reactor 6 in line 7. A gas-solids suspension is conducted in line 8 to the cyclone 9, in which substantially all dust-like solid particles transported from the reactor 6 are extensively separated from the gas. The solids which have been collected in the cyclone 9 are recycled to the reactor 6 in line 10. Because of the circulation of the solids, the gasification residue which is withdrawn through line 7 has a very low carbon content and in some cases—depending on the quality requirements specified for the cement—is admixed with the raw meal used in the production of the cement.

The dust-containing gas is fed in line 46 to the cooler 11 and is cooled therein to a temperature from 200° to 400° C. Air is used as a cooling fluid in the cooler 11 and is fed to the cooler 11 in line 12 and, after it has been heated, is fed in line 29 to the heat exchanger 49 and is used therein to heat the purified gas that flows in line 20. The air which has been used to reheat the purified gas leaves the heat exchanger 49 in line 53.

The dust-containing gas which has been cooled is fed in line 47 to the entrained dust reactor 13, which is supplied with CaO and/or $Ca(OH)_2$ through line 14. The calcium compounds react with at least part of the pollutants HF, HCl, $SO_2$ and $H_2S$ and the salts formed by the reaction are fed from the entrained dust reactor 13 into the line 15, which leads to the line 10. As a result, the solids formed in the entrained dust reactor 13 enter the reactor 6. The gas leaving the entrained dust reactor 13 flows in line 16 to the cyclone 17 and then flows in line 18 to the electrostatic filter 19. The gas is dedusted in the two units and the dust collected in the cyclone 17 and the electrostatic filter 19 is fed to line 15. The dedusted gas has a net heating value of about 1450 kcal/$sm^3$ ($sm^3$=standard cubic meter) and contains the combustible components CO, $H_2$ and $CH_4$ and leaves the electrostatic filter 19 in line 20 and after it has been heated is divided into three partial streams 21, 22 and 50.

The partial stream 21 is fed to the main burner of the rotary kiln 23, in which cement clinker is produced by a burning operation at about 1500° C. To maintain the burning temperature at about 1500° C. in the rotary kiln 23, the burner of the rotary kiln is supplied through line 24 with high-grade fuel, i.e. natural gas or fuel oil. The cement clinker is taken from the rotary kiln 23 in line 25 and is cooled in the clinker cooler 26, in which air is used as a cooling fluid. That air flows through line 27 into the clinker cooler 26 and is heated therein and thereafter a part of that air is fed in line 28 as combustion air to the rotary kiln 23, another part is fed in line 3 as gasifying air to the reactor 6 and an additional part is fed in line 51 as combustion air to the calciner 38.

The raw meal for producing cement is initially in the storage bin 30 and is suspended in line 52 and is suspended in line 52 in the exhaust gas stream which flows from the heat exchange cyclone 31 through line 32 into the heat exchange cyclone 33. The raw meal which has been preheated in line 32 and in the heat exchange cyclone 33 is collected in the cyclone 33 and is then fed in line 34 to the heat exchange cyclone 31. For that purpose, the raw meal is entrained by exhaust gas which has been withdrawn from the heat exchange cyclone 35 in line 36. The raw meal is heated further as its is conveyed in line 34 and during its residence time in the heat exchange cyclone 31. The raw meal which has been collected is fed in line 37 to the heat exchange cyclone 35. The raw meal that is fed in line 37 is suspended in the exhaust gas stream which is discharged in line 48 from the calciner 38, which consists of a cyclone. There preheated raw meal which has been collected in the heat exchange cyclone 35 is fed to the calciner 38 in line 39, into which the line 40 opens, in which the hot exhaust gas is conducted from the rotary kiln 23. The preheated raw meal is calcined in the calciner 38 and is subsequently collected and is then fed in line 41 to the rotary kiln 23, in which the burning process actually is performed.

The partial stream 22 of gas is admixed to the exhaust gas which is conducted in the line 40 from the rotary kiln 23. That admixing results in a substantial denitrification of the exhaust gas. The third partial stream of gas flows in line 50 to the calciner 38 and is combusted therein with the preheated air which is conducted in line 51. The raw meal is calcined by the heat which is generated by that combustion. In the calciner 38 and in the line 40 a denitrification is effected to such a degree that the $NO_x$ content is decreased by at least 90% from about 2000 mg $NO_2$/$sm^3$ to about 200 mg $NO_2$/$sm^3$. The partial stream 22 of gas is admixed in the line 40 at that point where the temperature is <1100° C. The exhaust gas which is conducted from the rotary kiln in line 40 still contains 1.5 to 10% oxygen. Because the fuel gas conducted in line 22 contains from 0.6 to 2 g $NH_3$/$sm^3$ and because about 40 mg $NH_3$ is required to reduce 100 mg $NO_2$, the amount required for the denitrification reaction can be controlled by continuous measurement of the $NH_3$ content of that partial stream of gas which is conducted in line 22. The additional reducing agents supplied together with the ammonia consist mainly of CO and $H_2$ and are combusted in the calcining stage together with that partial stream of gas which is conducted in line 50. New $NO_x$ is not formed also in the calciner.

The exhaust gas leaving the preheating cyclone 33 flows in line 42 to the cyclone 43 and is dedusted therein. The dust is fed in line 44 to the preheating cyclone 33. The exhaust gas which has been dedusted, cooled, desulfurized and denitrified leaves the plant in line 45.

While the invention has been illustrated and embodied in a process for making cement using low-grade fuels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a process for producing cement, said process comprising the steps of preheating a mixture of ground raw materials in a preheating cyclone to form a preheated raw meal, calcining the preheated raw meal in a calciner to form a calcined raw meal, burning the calcined raw meal in a rotary kiln having a main burner with the aid of a high-grade fuel to form a cement clinker and an exhaust gas stream, cooling the cement clinker and grinding the cooled cement clinker, the improvement comprising replacing 50 to 70% of said high-grade fuel with a low-grade fuel, gasifying said low-grade fuel in a fluidized bend to form a resulting fuel gas, supplying a first portion of the resulting fuel gas to the main burner of the rotary kiln, a second portion of the resulting fuel gas to the exhaust gas stream from the rotary kiln and a third portion of the resulting fuel gas to the calciner.

2. Process as defined in claim 1, wherein said fluidized bed is a circulating fluidized bed.

3. Process as defined in claim 1, wherein the improvement further comprises supplying combustion air to said rotary kiln in said burning and gasifying air to said fluidized bed during said gasifying and preheating the combustion air and the gasifying air in a clinker cooler provided for said cooling of said cement clinker.

4. Process as defined in claim 3, wherein the improvement further comprises cooling said resulting fuel gas to a temperature of 70° to 400° C. and dedusting in at least one dedusting apparatus to form a dedusted cooled resulting gas.

5. Process as defined in claim 4, wherein said dedusting apparatus is at least one cyclone.

6. Process as defined in claim 4, wherein said dedusting apparatus is at least one electrostatic filter.

7. Process as defined in claim 4, wherein said dedusting apparatus is at least one bag filter.

8. Process as defined in claim 4, wherein after said dedusting and said cooling, wherein the improvement further comprises reacting said dedusted and cooled resulting gas at 70° to 400° C. with a member selected from the group consisting of CaO and Ca(OH)$_2$.

9. Process as defined in claim 3, wherein the improvement further comprises taking a fourth portion of said resulting gas and burning said fourth portion of said resulting gas to heat an exhaust air from said clinker cooler.

10. Process as defined in claim 4, wherein the improvement further comprises the step of heating the dedusted cooled resulting gas with heat contained in said resulting gas prior to said cooling and said dedusting.

11. Process as defined in claim 8, wherein the improvement further comprises, after said reacting with said member, heating said resulting gas again with heat contained in said resulting gas prior to said reacting.

12. Process as defined in claim 1, wherein said low-grade fuel is selected from the group consisting of biomass, waste wood, chemical industry waste material, used tires and paper and said high-grade fuel is selected from the group consisting of gas, oil and coal.

13. Process for producing cement, comprising the steps of:
  a) gasifying a mixture containing 30 to 50% of a high-grade fuel selected from the group consisting of coal, oil and gas and 50 to 70% of a low-grade fuel selected from the group consisting of biomass, waste wood, chemical industry waste material, used tires and paper in a circulating fluidized bed rector to form a resulting fuel gas;
  b) preheating a mixture of ground raw materials in a preheating cyclone to form a preheated raw meal;
  c) calcining the preheated raw meal in a calciner with a third portion of said resulting fuel gas to form a calcined raw meal;
  d) burning the calcined raw meal in a rotary kiln by supplying a first portion of said resulting fuel gas to a main burner of the rotary kiln to form a cement clinker;
  e) supplying a second portion of said resulting fuel gas to an exhaust gas stream from the rotary kiln; and
  e) cooling the cement cylinder and grinding the cooled cement clinker.

14. Process as defined in claim 13, further comprising supplying combustion air to said rotary kiln in said burning and gasifying air to said fluidized bed during said gasifying and preheating the combustion air and the gasifying air in a clinker cooler provided for said cooling of said cement clinker.

15. Process as defined in claim 14, further comprising cooling said resulting fuel gas to a temperature of 70° to 400° C. and dedusting in at least one dedusting apparatus to form a dedusted cooled resulting gas.

16. Process as defined in claim 15, wherein said dedusting apparatus is at least one cyclone.

17. Process as defined in claim 15, wherein said dedusting apparatus is at least one electrostatic filter.

18. Process as defined in claim 15, wherein said dedusting apparatus is at least one bag filter.

19. Process as defined in claim 15, wherein after said dedusting and said cooling, reacting said dedusted and cooled resulting gas at 70° to 400° C. with a member selected from the group consisting of CaO and Ca(OH)$_2$.

20. Process as defined in claim 14, further comprising taking a fourth portion of said resulting gas and burning said fourth portion of said resulting gas to heat an exhaust air from said clinker cooler.

* * * * *